United States Patent [19]

Theurer et al.

[11] Patent Number: 4,929,816
[45] Date of Patent: May 29, 1990

[54] ELECTRIC FLASH-BUTT WELDING MACHINE AND METHOD OF PROVIDING A WELDED JOINT BETWEEN ADJACENT ENDS OF RAIL SECTIONS

[75] Inventors: Josef Theurer, Vienna; Friedrich Oellerer, Linz; Leopold R. Gruber, Scheibbs, all of Austria

[73] Assignee: Franz Plasser Bahnbaumaschinen-Industriegesellschaft GmbH, Vienna, Austria

[21] Appl. No.: 301,330

[22] Filed: Jan. 24, 1989

[30] Foreign Application Priority Data

Feb. 1, 1988 [EP] European Pat. Off. ........ 88890021.4
Feb. 1, 1988 [EP] European Pat. Off. ........ 88890022.2

[51] Int. Cl.⁵ .............................................. B23K 11/04
[52] U.S. Cl. ........................................ 219/53; 219/97; 219/100
[58] Field of Search ................... 219/53, 54, 55, 97, 219/100

[56] References Cited

U.S. PATENT DOCUMENTS 3,349,216 10/1967 Paton et al. .
4,272,664 6/1981 Theurer .
4,414,454 11/1983 Zollinger .............................. 219/53

FOREIGN PATENT DOCUMENTS 0132227 1/1985 European Pat. Off. .
1161307 8/1969 United Kingdom .
1294216 10/1972 United Kingdom .
1513014 6/1978 United Kingdom .
2000829 1/1979 United Kingdom .

OTHER PUBLICATIONS

Plasser & Theurer prospectus K 355 Apt, Feb. 86.
Railway Gazette, Oct. 1977.

Primary Examiner—Clifford C. Shaw
Attorney, Agent, or Firm—Kurt Kelman

[57] ABSTRACT

A mobile electric flash-butt welding machine comprises machine frame, undercarriages supporting the machine frame on a railroad track, and a drive for propelling the machine frame along the track. The machine frame carries a hydraulic fluid supply pump, an electric current generator, a motor for operating the pump and the generator, a longitudinally, transversely and vertically adjustable electric flash-butt welding head for selectively welding together the adjacent rail section ends of a respective one of the track rails, the welding head comprising two welding halves movable towards and away from each other in a direction of the rail, hydraulic cylinders for moving the two welding head halves in said direction, a pair of clamping and welding jaws on each welding head half, and a hydraulic clamping cylinder connecting the jaws of each pair. The machine frame also carries a welding control connecting the pump and generator to the hydraulic cylinders and jaws respectively for hydraulically and electrically operating the clamping and welding jaws, and an apparatur for tensioning or longitudinally sliding the rail, the apparatus being associated with the welding head for encompassing the welding head in a horizontal plane passing through the rail and comprising two pairs of rail clamping jaws for engaging adjacent rail section ends immediately ahead of, and behind, the welding head, and a hydraulic cylinder-piston arrangement extending in the direction of the rail and comprising respective operating cylinders connecting the pairs of rail clamping jaws for operation thereof.

23 Claims, 3 Drawing Sheets

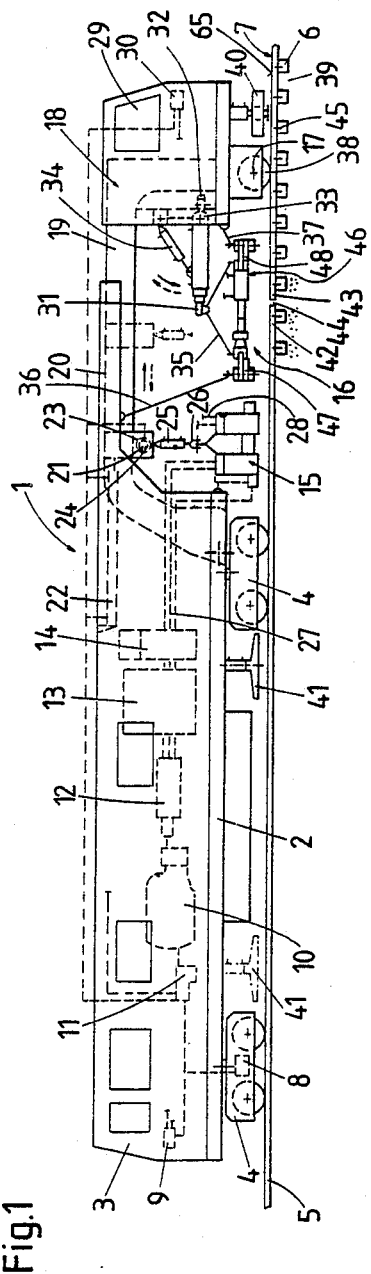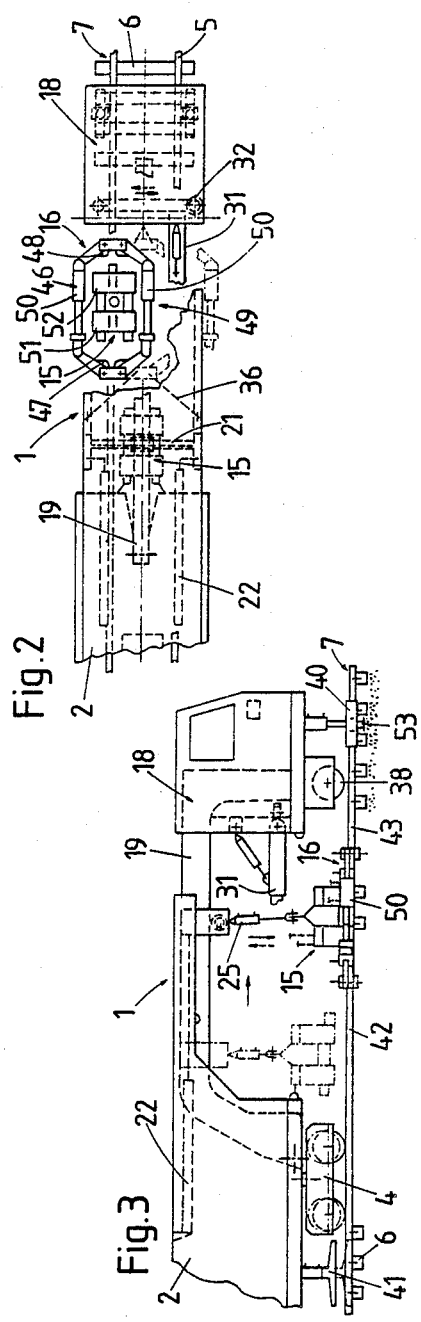

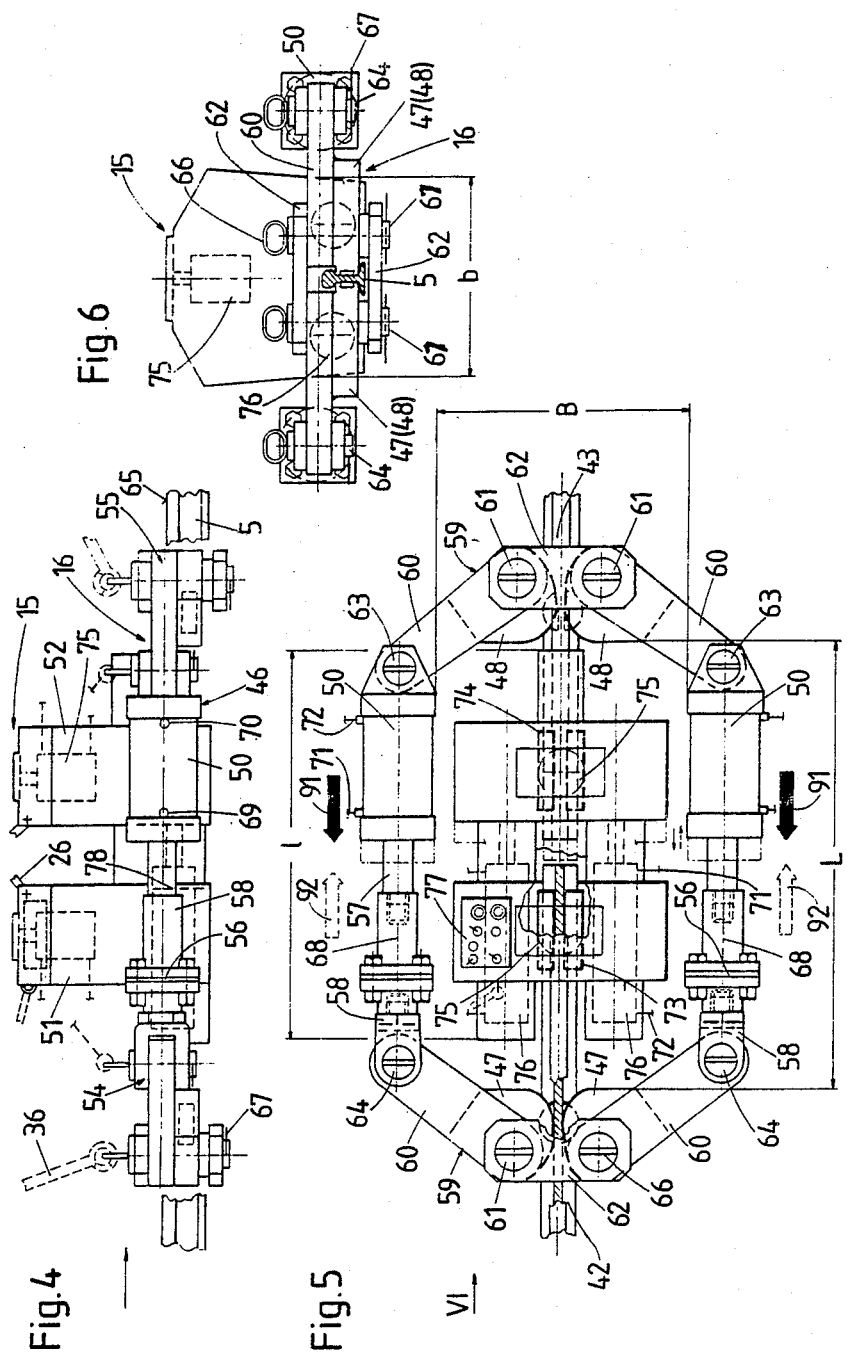

ELECTRIC FLASH-BUTT WELDING MACHINE AND METHOD OF PROVIDING A WELDED JOINT BETWEEN ADJACENT ENDS OF RAIL SECTIONS

BACKGROUND OF THE INVENTION (1) Field of the Invention

The present invention relates to a mobile electric flash-butt welding machine for welding together adjacent ends of successive rail sections of a rail of a track consisting of two rails fastened to successive ties, which machine comprises machine frame, undercarriages supporting the machine frame on the track for mobility therealong in an operating direction, and a drive for propelling the machine frame along the track. The machine frame carries a hydraulic fluid supply pump means, an electric current generator, motor means for operating the pump means and the generator, and a longitudinally, transversely and vertically adjustable electric flash-butt welding head for selectively welding together the adjacent rail section ends of a respective one of the track rails. The welding head comprises two welding head halves movable towards and away from each other in a direction of the rail, hydraulic cylinders for moving the two welding head halves in this direction, a pair of clamping and welding jaws on each welding head half, a hydraulic clamping cylinder connecting the jaws of each pair, and optionally a hydraulically operable welding seam shearing device. A welding control connects the pump means and generator to the hydraulic cylinders and jaws respectively for hydraulically and electrically operating the clamping and welding jaws.

(2) Description of the Prior Art

A mobile flash-butt welding machine of this type has been disclosed in the Plasser & Theurer prospectus K 355 APT, of February 1986. In this machine, the generator for supplying electric current to the welding jaws and the control box are mounted on the machine frame between two operator's cabs arranged at the front and rear ends of the machine frame. One of the cabs is longitudinally displaceable and has an open end for accommodating a double-arm telescopic jib crane pivotal about a vertical axis on the machine frame. The welding head is vertically adjustably suspended from a free end of the crane and the crane movements are powered by hydraulic cylinders. When the cab is retracted, the crane can turn 90° with respect to the center axis of the machine frame, the center of the welding head being adjustable up to 3250 mm from the center of the track. When the machine is moved between operating sites, the crane is retracted through the open end into the cab, the cab is longitudinally displaced to the end of the machine frame and the open end is closed. A respective pair of clamping and welding jaws for engaging the rail web therebetween is arranged at the underside of each welding head half, and these jaws serve not only to clamp the rail but also conduct the electric welding current. The hydraulic clamping cylinders are connected to mechanical lever systems on each welding head half for pressing the jaws into engagement with the rail web. The welding head carries a control panel for initiating and ending the welding operation as well as for the control thereof.

In the method of providing an electric flash-butt joint between adjacent ends of successive rail sections of a rail of a track consisting of two rails fastened to successive ties, the welding machine is moved to the operating site and after the welding head has been lowered and centered over the gap between the adjacent rail sections ends to be welded together, the successive rail section ends ahead and behind the joint are clamped by the two pairs of clamping and welding jaws. At the same time, the clamped rail section ends are accurately leveled and lined. The "automatic" operating switch is then actuated for the programmed welding operation. In the initial stage, the two hydraulic cylinders are operated to move the two welding head halves with the rail section ends clamped thereto towards each other at an approximate speed of 0.25 mm/second until the two ends touch. Upon contact of the rail section ends and the resultant short circuit, the welding current reaches its first peak value. As soon as the control including a current measuring device senses this, the movement of the two welding head halves towards each other is stopped while the temperature of the two rail section ends rises sharply. After about a second, the two welding head halves are moved apart, causing the two rail section ends to be torn apart again and their temperature to be lowered, which instantly iniates the movement towards each other. This to-and-fro movement is repeated several times, the temperature of the two rail section ends increasing progressively. When the temperature at the contact between the two rail section ends has reached a critical point, a welding melt occurs. After about 30 seconds of this unstable welding phase, the progressive heating of the welding joint leads to a stable welding phase during which the two rail section ends are moved towards each other at a constant speed. After a preselected welding time has passed, the progression phase is initiated. Within about ten seconds, the speed of the movement is tripled or quadrupled, causing a corresponding increase in the current density and raising the welding temperature to its maximum. The welding current is now discontinued and the clamping and welding jaws are held in position. A hydraulic fluid flow control valve is now operated to increase the hydraulic fluid flow to the cylinders to move the two rail section ends together at a rapid pace in a final compression stage so that the rail section ends are pressed together at a set value. The movement is then discontinued while the clamping and welding jaws hold the welded rail section ends in position for a few seconds until the welded joint has cooled off a little. Afterwards, the clamping and welding jaws are released, the welding head halves are retracted while two weld seam shearing knives are closed and the welding head halves are moved together again to shear off the welding seam. The clamping and welding jaws as well as the shearing knives are then opened, and the welding head is lifted off the welded rail. The machine is now ready for movement to the next operating site.

This machine and various operating modes thereof are also described in great detail in the October 1977 issue of "Railway Gazette".

U.S. Pat. No. 3,349,216, dated Oct. 24, 1967, discloses an electrically operated flash-butt welding head useful in rail welding operations, which comprises two welding halves displaceable with respect to each other and designed to clamp the adjoining rail sections and pull them together. The rail clamps constitute welding elements and have a common rotary axis wherealong they are displaceable by means of hydraulically operated cylinders. The piston rods of the operating cylinders connect the clamps and are arranged symmetrically with respect to the weld and are coplanar therewith. The rotary axis is constituted by a hollow rod containing a control valve for uniformly delivering hydraulic fluid to the operating cylinders and the control valve is actuated by an electromagnetic drive mounted on the rod.

British patent No. 1,513,014, published June 1, 1978, also discloses an electric flash-butt welding head with clamping and welding jaw pairs for engaging a rail web by means of a lever system operable by a clamping cylinder. A welding seam shearing device comprises four shearing knives which completely encompass the profile of the rail in their operating position. Such a welding seam shearing device incorporated into the welding head makes it possible to use the same without any auxiliary equipment.

The welding machine disclosed in U.S. Pat. No. 4,272,664, dated June 9, 1981, provides a hydraulic support shoe for the machine frame to relieve the track rails of the machine weight before the welding. The thus relieved rail may then be slid more readily to reduce the welding gap.

The flash-butt welding heads in these machines exert a sufficient tensioning force on the rail sections to enable short rail sections to be welded together or to weld together longer rail sections if they are supported on rollers to reduce frictional resistance to a minimum. In end welds, the rails are lifted out of their fastening elements and changes in the rail length due to welding are compensated for by inserting corresponding lengths of rail section. However, a relatively large tensioning force is required to provide flash-butt welded joints between longer rail sections, particularly when they are not supported on anti-friction rollers, in cases where so-called thermite weld joints are cut out, resulting in large welding gaps which must be replaced by flash-butt welded joints, as well as for end welds at temperatures below the normal welding temperature and continuous welded track rails.

To enable the gap between adjacent rail section ends to be reduced after the elements fastening them to the ties have been loosened and thus to prepare for the flash-butt welding with such welding heads, British patent No. 1,294,216, published Oct. 25, 1972, discloses a hydraulic tensioning device for continuous welded rail, which is constituted by a ring-shaped structural unit comprising two longitudinally spaced pairs of rail clamping heads interconnected by tie members extending above and below the rail for rotation about a vertical axis. Short bell-crank levers connect the clamping jaws respectively with hydraulic cylinders and tensioning members extending in the direction of the rail and parallel to a horizontal plane passing through the rail. A manually operated pump delivers hydraulic fluid to the cylinders and when they are operated, the clamping jaws clampingly engage the rail web and, upon additional hydraulic pressure being applied, the clamped ends of the two adjoining rail sections, whose fastening elements have previously been loosened, are pulled together to reduce the gap between the adjacent rail section ends and enable them to be welded together. This device is relatively heavy and may be disassembled. The device is mounted on the rail sections at each welding site, dismounted after use and transported to the next site where it is mounted again and operated by the manually operated hydraulic fluid pump. To enable the device to be readily transported from welding site to welding site, it has been made as small and light as feasible, thus limiting the dimensions of the central space within the ring-shaped unit. Even so, the unit may weigh as much as about 400 kg and is, therefore, difficult to handle, which considerably delays the operations.

A similar, but much lighter and even smaller, rail tensioning device has been disclosed in British patent No. 1,161,307, published Aug. 13, 1969. This device has such small dimensions that its tensioning force suffices only for longitudinally sliding or stretching very short and light rail sections.

European patent No. 132,227, published Jan. 23, 1985, discloses a ring-shaped rail tensioning unit for use in welding together the adjacent ends of rail sections. This unit is designed for longitudinally, vertically and laterally displacing a respective rail section end for centering the same with respect to an adjacent rail section end before the ends are welded together. It is a rather complicated device including a number of servo-mechanisms and provides a central space holding a shearing device with cutters for removing the weld seam. As the drawing clearly shows, this space is much too narrow to hold a flash-butt welding head.

British patent No. 2,000,829. published Jan. 17, 1979, also discloses a very complicated apparatus for aligning and setting the gap between adjacent rail section ends to be subsequently joined together by a fish plate or welding. There is no room in this apparatus for accommodating a flash-butt welding head so that the pulled-together rail section ends can be joined only in a thermite welding process. This type of rail welding is not only difficult and must be effected manually but it also results in a relatively weak rail joint.

SUMMARY OF THE INVENTION

It is the primary object of this invention to improve a mobile flash-butt welding machine of the first-described type so that it may be used under greatly varying operating conditions and may have available enhanced pulling power for moving the two rail section ends together to reduce the gap therebetween during the initial welding stage and/or during the final compression stage when the two rail section ends are pressed together.

The above and other objects are accomplished according to the invention by associating an apparatus for tensioning or longitudinally sliding the rail with the welding head for encompassing the welding head in a horizontal plane passing through the rail, which apparatus comprises two pairs of rail clamping jaw means for engaging the rail section ends immediately ahead of, and behind, the welding head, and a hydraulic cylinder-piston arrangement extending in the direction of the rail and comprising respective operating cylinders connecting the pairs of rail clamping jaw means for operation thereof.

This unexpectedly simple and effective combination of a rail tensioning apparatus with the flash-butt welding head gives the machine added pulling power without requiring any change in the very successful welding head design since it is now possible to use not only the clamping and welding jaws of the welding head but additionally the rail clamping jaw means of the rail tensioning apparatus for moving the rail section ends together. This is of particular advantage when long and heavy rail sections are to be welded together since the fastening elements need only be detached before welding and it is not necessary to support the rail sections on roller bearings to enable them to slide longitudinally. The final compression force at the end of the flash-butt welding can be applied in this manner even in the case of the heaviest rails, which enhances the flash-butt welding of rails economically and qualitatively. The tensioning of the rail sections by the welding head and the rail tensioning apparatus may be effectuated separately or in unison, as desired. The machine may be used advantageously in a number of ways. For example, the gap between the rail section ends may be reduced solely by operation of the rail tensioning apparatus or in conjunction with the approaching movement of the welding head halves before welding is initiated, whereupon the welding head alone is operated to weld the rail section ends together, the final compression stroke being carried out by the common use of the welding head and rail tensioning apparatus. Furthermore, the rail tensioning apparatus may be used separately from the welding head in preparatory operations.

BRIEF DESCRIPTION OF THE DRAWING

The above and other objects, advantages and features of the present invention will become more apparent from the following detailed description of a now preferred embodiment thereof, taken in conjunction with the accompanying, partly schematic drawing wherein FIG. 1 is side elevational view of a mobile flash-butt welding machine incorporating a welding head and a rail tensioning apparatus associated therewith according to this invention;

FIG. 2 is a fragmentary top view of the welding machine of FIG. 1, showing the welding head encompassed by the rail tensioning apparatus in operating position;

FIG. 3 is a fragmentary side elevational view of the welding machine in the operating position of FIG. 2;

FIG. 4 is an enlarged side elevational view of the welding head and the encompassing rail tensioning apparatus;

FIG. 5 is a top view of the assembly of FIG. 4;

FIG. 6 is an end view of the assembly of FIG. 5 in the direction of arrow VI;

DETAILED DESCRIPTION OF THE PREFERRED EMBODIMENT

Figure 7:
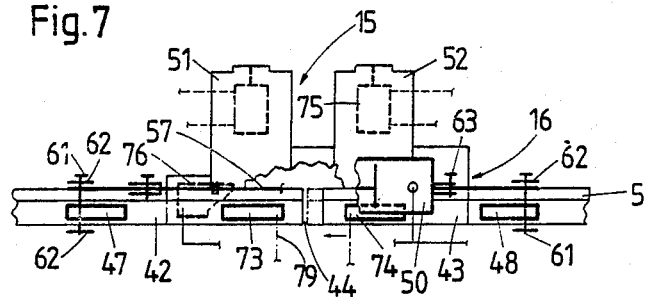
FIG. 7 is a highly schematic side elevational view of the welding head and the encompassing rail tensioning apparatus in operating position.

FIG. 1 illustrates mobile electric flash-butt welding machine 1 for welding together adjacent ends of successive rail sections of rail 5 of track 7 consisting of two rails fastened to successive ties 6. The machine comprises elongated machine frame carrying driver's cab 3 at one end thereof, undercarriages 4 and 38 supporting the machine frame on the track for mobility therealong in an operating direction, and drive 8 propelling the machine frame along track 7. The machine frame comprises main frame part 2 and trailer frame part 18 comprising cantilevered bridge-like frame 19 pivotally supported on main frame part 2, the bridge-like frame being centered between one undercarriage 4 supporting main frame part 2 on track 7 and undercarriage 38 supporting trailer frame part 18 on the track. Adjacent the driver's cab, the main machine frame part 2 carries hydraulic fluid supply pump means 11, an electric current generator 12 and motor means 10 connected to the hydraulic fluid supply pump means and the electric current generator by suitable transmission means for operating the pump means and the generator. Electrical conductor means connects generator box 13 to generator 12.

Longitudinally, transversely and vertically adjustable flash-butt welding head 15 is mounted on centered bridge-like frame 19 between undercarriages 4 and 38 for selectively welding together the adjacent rail section ends of a respective track rail 5. Longitudinal and transverse guides 20, 21 in bridge-like frame 19 longitudinally and transversely displaceably carry welding head 15, which may be respectively longitudinally and transversely displaced therealong by hydraulic drives 22, 23. Transverse hydraulic drive 23 is a hydraulic motor with a pinion meshing with transversely extending rack 24. Welding head 15 is vertically adjustable by a hydraulic cylinder 25 carrying suspension 26 to which the welding head is attached. The welding head comprises two halves 51, 52 movable towards and away from each other in a direction of rail 5, hydraulic cylinder 76 (see FIG. 5) for moving the two welding head halves in this direction, a pair of clamping and welding jaws 73, 74 on each welding head half 51, 52, and hydraulic clamping cylinder 75 connecting the jaws of each pair. Two detachable fixing rods may be provided to attach welding head 15 to main machine frame part 2 in transit when the machine is moved between operating sites.

Welding control 14 is connected to generator box 13, electric current supply lines 27 connect welding head 15 to control 14 and hydraulic fluid supply lines 28 connect the welding head to pump means 11 for hydraulically and electrically operating the clamping and welding jaws of the welding head.

Apparatus 16 for tensioning or longitudinally sliding the rail is associated with welding head 15 for encompassing the welding head in a horizontal plane passing through rail 5, as shown in FIG. 2. This rail tensioning apparatus comprises two pairs 47, 48 of rail clamping jaw means for engaging rail section ends 42, 43 immediately ahead of, and behind, welding head 15, and hydraulic cylinder-piston arrangement 46 extending in the direction of rail 5 and comprising respective operating cylinders 50 connecting the pairs of rail clamping jaw means. In the illustrated embodiment, rail tensioning apparatus 16 is mounted within view of operator's cab 29 on trailer frame part 18 in transverse guide 33 transversely displaceably carrying the rail tensioning apparatus on the trailer frame part. Telescopingly extensible and retractible support arm 31 is laterally pivotal about the transverse guide by cable drive 32 and is vertically adjustable by hydraulic drive 34 so that suspension 35 carries apparatus 16 on support arm 31 for vertical, transverse and longitudinal adjustment. The adjustment drives for the positioning of the welding head and the rail tensioning apparatus include hydraulic operating cylinders actuated by control 30 in cab 29. As shown in FIG. 1, rail tensioning apparatus 16 is mounted ahead of welding head 15 in the operating direction in a longitudinally retracted position of the welding head so that the positioning drives longitudinally, transversely and vertically adjustably connecting the rail tensioning apparatus and the welding head to the machine frame enables them to be readily and simply centered above gap 44 while they are easily accessible to operators of the machine. Detachable fixing rods 36, 37 are provided to attach rail tensioning apparatus 16 respectively to a cantilevered arm of main machine frame part 2 and trailer frame part 18 in transit when the machine is moved between operating sites. Undercarriage 38 supporting the trailer frame part on track 7 is a single axle with flanged wheels engaging track rails 5, and vertically adjustable hydraulic support jack 40 is arranged to raise the trailer frame part off the track to relieve the track of the weight of trailer frame part 18. The support jack may engage track bed 39 or ties 6. Another vertically adjustable support jack 41 is arranged between swivel truck undercarriages 4 for raising main frame part 2. As shown in FIGS. 1 and 2, rail tensioning apparatus is centered above gap 44 between adjacent rail section ends 42, 43, and before rail section end 43 is tensioned or longitudinally slid to reduce gap 44, rail fastening elements 45 are loosened or detached to enable the rail section end to move longitudinally.

The two-part machine frame mounting the welding head and the rail tensioning apparatus successively and independently positionable has the advantage that the machine may be readily and quickly changed between transit and operating positions, and that the welding head and the rail tensioning apparatus may be operated independently of each other, if desired. Providing the support jacks has the advantage of taking the weight off the rail section being pulled.

As best shown in FIGS. 4 to 6, rail tensioning apparatus 16 comprises ring-shaped mechanical structural unit 49 including the two pairs 47, 48 of rail clamping means longitudinally spaced from each other in the direction of rail 5 and hydraulic cylinder-piston arrangement 46. The arrangement has a respective hydraulic cylinder-piston device with operating cylinder 50 arranged on each side of rail 5. Pairs 47, 48 of rail clamping jaw means are longitudinally spaced and the cylinder-piston devices are transversely spaced to define a central space within ring-shaped mechanical structural unit 49. The central space, measured in horizontal plane 65, has a width B and a length L at a maximum longitudinal spacing of the pairs of rail clamping jaw means in a rail clamping position respectively larger than width b and length l of the cross section of the maximally adjusted welding head halves. Such a large ring-shaped unit permits a flash-butt welding head to be accommodated within the unit without encountering any obstacle when the rail tensioning apparatus is in its operating position and allowing free movements of all operating parts of the welding head as well as the rail tensioning apparatus.

Operating cylinders 50 extend in the direction of rail 5 and have connections 69, 70 for flexible hydraulic fluid hoses 72 connecting the operating cylinders to hydraulic fluid supply pump means 11 for common operation with the hydraulic cylinders of welding head 15. Preferably, hydraulic cylinders 50 are constructed to exert a tensioning force of more than 120 tons, for example about 130 t, in the horizontal plane and the direction of the rail. Providing such high tensile forces at each side of the rail enables even heavy, long rail sections to be slid or tensioned longitudinally, particularly in conjunction with the operation of the clamping and welding jaws of the welding head, and without the time-consuming placement of roller bearings under such rail sections. Thus, the desired gap between the rail section ends may be readily provided to enable flash-butt welding to proceed properly. In this manner, even the rails of new track sections placed on a planed ballast bed with their ties may be welded together.

In the preferred embodiment herein disclosed, the welding head weighs about 2.5 tons and its width b in horizontal plane 65 is about 92.5 cm while its length l is about 162.5 cm. When the rail clamping jaw means engage the rail web, width B of the central space defined by structural unit 49 is about 107 cm and its length L is about 172.5 cm.

As shown in FIG. 3, trailer frame part 18 may be supported by two jacks 40 on ties 6 at respective sides of the trailer frame part in a lifted position and, if desired, auxiliary hydraulic jack 53 may support the trailer frame part on the ballast bed in this position. This causes undercarriage 38 to be raised off track 7 and rail section end 43 is thus relieved of the weight of the trailer frame part. After rail fastening elements 45 have been loosened or detached, this rail section end may, therefore, be longitudinally slid towards rail section end 42 to reduce the gap therebetween and facilitate the flash-butt welding. If it were desired to tension rail section end 42 in the same manner, undercarriage 4 supporting main frame part 4 adjacent welding head 15 may be raised in a like manner by operation of hydraulic jack 41.

Referring now to FIGS. 4 to 6, illustrating rail tensioning apparatus 16 in detail, its closed, ring-shaped mechanical structural unit is shown to include two longitudinally spaced pairs 47, 48 of rail clamping jaw means and two transversely spaced hydraulic cylinder-piston devices 46 with operating cylinders 50 for operating the rail clamping jaw means. Each device connects respective rail clamping jaw means of pairs 47, 48. A respective hydraulic cylinder-piston device 46 is arranged on each side of rail sections 42, 43 and flash-butt welding head 15 comprises two halves 51, 52 longitudinally adjustable with respect to each other.

As shown, the mechanical structural unit is comprised of two sections 54, 55 successively arranged in the direction of rail 5 and electrically insulated from each other. Each section is arranged symmetrically with respect to a longitudinal plane of symmetry of the unit. Connecting means, such as bolts or screws, fasten the two sections together at each side of the rail and the connecting means include electrical insulating layers 56. The electrical insulation between the longitudinally spaced pairs 47, 48 of rail clamping jaw means at each side of rail 5 interrupts any flow of electric current between the pairs of rail clamping jaw means. This insulation enables the rail tensioning unit to be used with an electrically operated flash-butt welding head without the danger of short circuits between the pairs of rail clamping jaw means, which would interfere with the welding process.

As best shown in FIG. 3, each pair of rail clamping jaw means comprises two bell crank lever arrangements 59 arranged mirror-symmetrically with respect to a vertical plane passing through rail 5, each lever arrangement consisting of clamping lever arm 60 and a clamping jaw, the parts of the rail tensioning apparatus being arranged substantially in horizontal plane 65 defined by the upper sides of the two track rails. Bell crank lever arrangements assure a particularly firm engagement of the rail clamping jaw means with the rails to assure a trouble-free transmission of the tensile forces applied by operating cylinders 50 to the clamped rail section. Each pair of rail clamping jaw means further comprises two detachable holding members 62 spanning rail 5 respectively thereabove and therebelow and arranged to connect and to hold transversely aligned lever arms 60 therebetween, and respective plug-in bolt 61 pivotally connects each lever arm to the holding members at each side of the rail. A spacing ring may be welded to the lower holding member for suitably distancing this holding member from the lever arm. Lever arms 60 of pair 48 of the rail clamping jaw means are linked directly to cylinders 50 of cylinder-piston devices 46, and the ring-shaped structural unit further comprises intermediate tensile members 58 linking lever arms 60 of the other pair 47 of rail clamping jaw means to the pistons of the cylinder-piston devices by means of piston rods 57. Lever arms 60 are connected to cylinders 50 and tensile members 58, respectively, by plug-in bolts 63, 64. Detachable splint or cotter pins 67 at the lower ends of the plug-in bolts hold the assembly in position. Plug-in bolts 61, 63, 64 have shackles or eyes 66 for attaching suspension means 36, 37 (shown in broken lines in FIG. 4) to ring-shaped rail tensioning unit 49. In this manner, the unit may be stored on a machine when it is moved between operating sites.

In this structure, electrical insulation 56 at each side of rail 5 is arranged between two coaxial screwed-together collars of intermediate tensile member 58 to interrupt the flow of electrical current between pairs 47, 48 of the rail clamping jaw means. This structure has the advantage that the tensile forces are transmitted without problems through electrically insulated screw connections which extend perpendicularly to transversely extending electrical insulating layers 56.

Flexible hydraulic fluid hoses 71, 72 connect inlets and outlets 69, 70 in cylinders 50 to hydraulic fluid supply pump means 11 operating the rail clamping jaw means. The flexible connecting hoses enable rail tensioning apparatus 16 to be moved freely under the relatively long bridge-like frame 19 of machine 1 while assuring the connection of operating cylinders 50 to their fluid supply in all positions of the apparatus. Since the common hydraulic fluid supply pump means is connected to welding control 14, the hydraulic cylinders of welding head 15 and operating cylinders 50 of rail tensioning apparatus 16 may be synchronized so that the welding head and the rail tensioning apparatus function as an operating unit for tensioning the rail under a uniform pressure.

The distance between plug-in bolts 63 and 64 along tensioning or pulling axis 68 is about 1.5 m in the illustrated embodiment and the stroke of operating cylinders 50 is about 30 cm. The distance of 1.5 m at a half-extended position of piston rods 57 enables apparatus 16 to encompass welding head 15 without obstruction or contact therewith, the distance between axes 68 of piston-cylinder devices 46 being about 1.4 m when the clamping jaw means are in clamping engagement with the rail web.

Each welding head half 51, 52 has a pair 73, 74 of clamping and welding jaws, and hydraulic clamping cylinder 75 is connected to each pair for pressing the jaws against the rail web. Two hydraulic cylinders 76 extending in the direction of the rail connect the two welding head halves for moving towards and away from each other. The pairs of clamping and welding jaws are moved in common with the welding head halves (or one half in relation to the other) while the jaws are in clamping engagement with the respective rail sections 42, 43. Control panel 77 is mounted on welding head 15 to operate the welding head. Welding head half 51 connected to hydraulic cylinders 76 incorporates hydraulic shearing device 78 for removing the welding seam after the joint has been completed.

FIG. 6 illustrates the clamping engagement of pairs 47, 48 of rail clamping jaw means with the rail web. The interconnecting holding members 62 above and below rail 5 make it possible to transfer considerable clamping forces from the transversely opposite clamping lever arms 60 to the rail. The clamping jaws are welded to the lever arms or are integral therewith and, as indicated in broken lines in FIG. 5, intermediate rail web engaging elements may be mounted on the clamping jaws to provide improved clamping and/or insulation. The transmission of the clamping forces to the clamping and welding jaws of the welding head from hydraulic cylinders 75 is effected by a lever system (not illustrated but fully disclosed in the flash-butt welding heads of the prior art discussed hereinabove).

The schematic drawing of FIG. 7 shows pairs 73, 74 of the clamping and welding jaws of welding head 15 as well as pair 47, 48 of the rail clamping jaw means of rail tensioning apparatus 16 engaged with the rail webs of rail sections 42 and 43. The clamping and welding jaws serve simultaneously as rail clamping elements and as welding electrodes through which the electric current flows through conductors 27 (FIG. 1) and 79 into the rail section ends adjacent gap 44.

Figure 8:
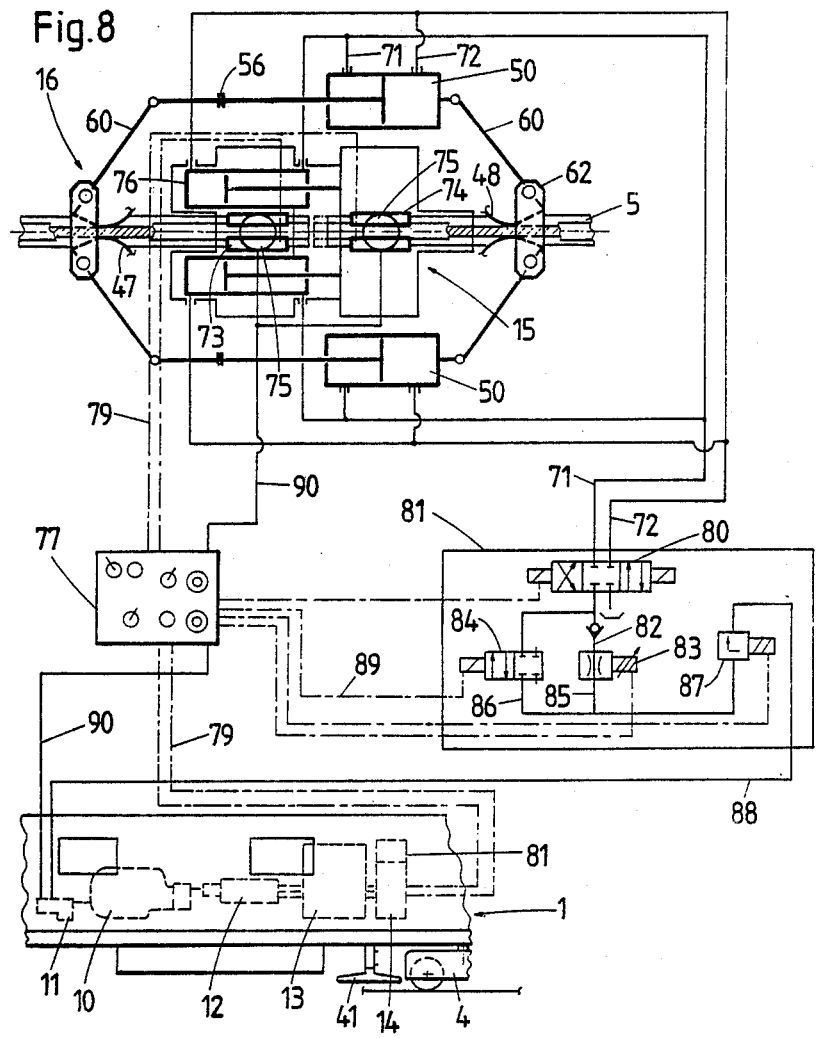
FIG. 8 is a similarly schematic top view of FIG. 7, showing the electro-hydraulic control circuit for the common operation of the two welding head halves and the rail tensioning apparatus.

The circuit diagram of FIG. 8 shows hydraulic fluid supply lines 71, 72 connected respectively to operating cylinders 50 and hydraulic cylinders 76 and connecting the cylinders to hydraulic fluid control means 81 comprising 4/3-way valve 80. Further unidirectional hydraulic line 82 incorporating a check valve leads from valve 80 to an inlet of proportional hydraulic flow control valve 83 and hydraulic fluid line 85 leads from the outlet thereof. Control block 81 further comprises 4/2-way valve 84 connected to further hydraulic fluid line 86 interconnecting the inlet and outlet of valve 83, and two-stage pressure control valve 87 connected to valve 84. Hydraulic fluid supply line 28 (see FIG. 1) and line 88 connect valve 87 to hydraulic fluid supply pumps means 11. Valves 80, 83, 84 and 87 of control block 81 are electrically connected to control panel 77 on welding head 15 by conductors 89 so that they may be actuated from the control panel. The control panel is also connected by hydraulic fluid supply line 90 to the hydraulic fluid supply pump means for operating clamping cylinders 75. The hydraulic flow control valve is arranged to change the flow of the hydraulic fluid passing through operating cylinders 50 and clamping cylinders 75, and the electrical line connecting this valve to the welding control transmits an analog electrical control signal of a respective welding program for changing the operating speed of the cylinders in response to the control signal. Such a control enables the cylinders to be controllably operated under a uniform pressure. The reciprocation of the pistons in the cylinders can be controlled by the hydraulic fluid flow control valve to obtain the desired speed, the analog signal controlling the fluid flow. The speed of all four cylinders is proportional to the volume of the fluid flow, producing a uniform and equal reciprocating path for all cylinders.

The above-described mobile flash-butt welding machine operates in the following manner:

As soon as machine 1 has reached gap 44, rods 36, 37 as well as the rods attaching welding head 15 to the machine frame are detached so that rail tensioning apparatus 16 as well as the welding head are free to be longitudinally, transversely and vertically adjusted. Cable drive 32 is operated to adjust the rail tensioning apparatus together with drives 31 and 34 transversely until the apparatus is symmetrically centered over rail sections 42, 43. While the apparatus is still suspended, splint pins 67 and lower holding members 62 are removed to enable the apparatus to be lowered into engagement with the rail sections by operation of drive 34, with outer plug-in bolts 61 being positioned in a respective crib between adjacent ties 6. The lower holding members are thereupon re-attached by means of splint pins 67 so that apparatus 16 assumes the position shown in FIG. 6. Rail fastening elements 45 are loosened or detached from rail section 43 to enable this rail section to be tensioned or longitudinally slid.

If gap 44 between the two rail section ends wherebetween an electric flash-butt joint is to be provided is quite large, i.e. of the order of more than 5 cm, rail tensioning apparatus 16 may first be used for longitudinally sliding rail section end 43 towards rail section end 42 before welding head 15 is utilized. For this purpose, the successive rail section ends ahead and behind the joint are clamped by the two pairs 47, 48 of rail clamping jaw means engaging the rail section ends immediately ahead of, and behind, the welding joint. Rail section end 43 is then tensioned or longitudinally slid by operating hydraulic cylinder-piston arrangements 46 extending in the direction of rail 5 and comprising operating cylinders 50 connecting the pairs of clamping jaw means for operation thereof. At first, operating cylinders 50 are actuated so that piston rods are maximally extended out of the cylinders. This increases the distance between pairs 47, 48 of the rail clamping jaw means to a maximum. The two operating cylinders are then actuated to move in the opposite direction, which causes clamping lever arms 60 to be pivoted into clamping engagement with the rail web. As soon as this small pivoting motion has been completed, further retraction of piston rods 57 into operating cylinders 50 causes clamped rail section end 43 to be pulled towards clamped rail section end 42 since the former has been detached from the ties and relieved from the weight of trailer frame part 18 by the operation of jack 40 lifting undercarriage 38 of track 7. If gap 44 is still too large, this procedure may be repeated by movement in the direction of arrows 91 (FIG. 5) until the gap has the desired size. If desired, rail section end 43 may be held stationary and rail section end 42 may be tensioned in the above-indicated manner in the direction of arrows 92 (shown in broken lines in FIG. 5) while it is detached from the ties and relieved of the weight of main machine frame part 2 by raising jack 41. It is also possible to move both rail section ends towards each other in this way.

Even while rail tensioning apparatus 16 is thus operated, welding head 15 may be placed within ring-shaped mechanical structural unit 49 of the apparatus by operation of drives 22 and 23 and may be lowered onto rail section ends 42, 43 in the manner shown in FIG. 2. Clamping cylinders 75 are then operated to engage pairs 73, 74 of the clamping and welding jaws with the rail webs. If the welding head and the rail tensioning apparatus are to be used together for reducing the gap between the rail section ends, hydraulic cylinders 76 of the welding head are operated at the same time as operating cylinders 50 of the rail tensioning apparatus for moving the welding head halves towards each other simultaneously with the rail tensioning effected by apparatus 16. On the other hand, if desired, only welding head cylinders 76 may be operated if gap 44 is small enough for providing the flash-butt welding joint.

In this method, the welding head operation and the rail tensioning are advantageously coordinated at each weld joint and can be effectuated simultaneously or in any desired sequence. In this manner, the tensile force of the reciprocable welding head halves may be reinforced for operation on long and heavy rails without expensive structural changes in the welding head. All that is required is to loosen or detach the rail fastening elements to make tensioning or longitudinal sliding of a heavy rail possible without the need for roller supports of the rail. The method may also be used to prepare a rail joint for welding if the gap between the adjacent rail section ends is too large for flash-butt welding, for example, where thermite welded rail sections are cut out to be replaced by flash-butt welded joints. Furthermore, the additional rail tensioning is very useful in the final compression welding stage when the two adjacent rail section ends must be pressed together with considerable force to obtain the desired joint. This produces a high-quality flash-butt welding joint in an economic and rapid operating stage even if the involved rail sections are very long and heavy.

The operation of the hydraulic cylinders of the welding head and rail tensioning apparatus at a desired speed is controlled by hydraulic flow control valve 83 of the welding control. This generates an analog electrical control signal to produce the desired hydraulic fluid flow to cylinders 50 and 76, the speed of displacement of the cylinders being proportional to the volume of the hydraulic fluid flow. If very high tensile forces are required for longitudinally sliding particularly long rail sections, a plurality of operating cylinders 50 may be connected in parallel to hydraulic cylinders 76 of welding head 15 to transmit tensile force to the rail section through additional pairs of rail clamping jaw means. The pairs 47, 48 of rail clamping jaw means and the pairs 73, 74 of clamping and welding jaws with their hydraulic cylinders 50, 76 form a compact operating unit in which all the cylinders are displaced at the same speed. It suffices, therefore, to produce the total of the required hydraulic fluid flow by means of valve 83. The resultant forces are distributed to cylinders 50, 76 according to the effective operating faces of their pistons.

As soon as the gap between the adjacent rail section ends has been reduced to the required dimension, the welding is initiated and proceeds automatically in responce to control 14, which is programmed to move the two adjacent rail section ends together and apart according to the hydraulic fluid flow until the rail section ends have been heated to the required melting temperature, the complex operation of the welding head being in no way hindered by the operation of the encompassing rail tensioning apparatus. At the end of the welding stage when the two heated rail section ends are pressed together with a compression impact, hydraulic fluid pressure control valve 87 is connected to increase the pressure. This produces a weld seam which is immediately and automatically sheared off by device 78 on the welding head. After the flash-butt welding joint has been completed, welding head 15 is raised by operation of drive 25, detachable lower holding members 62 of rail tensioning apparatus 16 are removed, cable suspension 35 is attached to eyes 66 of plug-in bolts 63, 64 of the apparatus, and the apparatus is raised off the rail. Afterwards, the lower holding members are mounted on the bolts again and retained thereon by inserting splint pins 67. After jack 40 is retracted, the machine is ready for movement to next gap 44 for another welding operation.

As has been mentioned before, it is also possible, if desired, to produce the small reciprocations of the rail section ends during the welding stage only by operation of hydraulic cylinders 76 of the welding head, in which case cylinders 50 of the rail tensioning apparatus are operated only during the final compression impact welding stage, which requires particularly strong tensile forces.

As is obvious from the above description, the mobile welding machine may be advantageously used in a variety of different welding procedures. Various types of mobile flash-butt welding machines may be used in these procedures as long as the welding head is transversely and vertically adjustable and has two halves which may be reciprocated by hydraulic cylinders in the direction of the rail and each welding head half carries a pair of clamping and welding jaws operable by a hydraulic cylinder.

In the most important welding procedure according to the present invention, welding head 15 is placed over gap 44 between adjacent rail section ends, the electrically and hydraulically operated pairs 73, 74 of clamping and welding jaws are actuated by control 14 to reciprocate and heat the adjacent rail section ends according to a predetermined welding program, and are then welded together in a final compression stage under very high pressure. The projecting weld seam is then sheared off by again engaging pair 74 of clamping and welding jaws of welding head half 52 with rail section end 43 and removing the weld seam with shearing device 78 on welding head half 51. According to the method of the invention, rail section ends 42, 43 are additionally clamped by pairs 47, 48 of rail clamping jaw means and at least one of the rail sections is also tensioned by actuation of operating cylinders 50 to reduce gap 44 between the adjacent rail section ends before welding is initiated and/or during the final compression impact welding stage in accordance with the welding program. Preferably, operating cylinders 50 and hydraulic cylinders 76 are connected in parallel to a common hydraulic fluid supply pump means 11 for operation by control 77, hydraulic fluid flow control valve 83 in the common hydraulic circuit assuring that the cylinders operate at the same displacement speed.

In another advantageous method, the pairs 47, 48 of rail clamping jaw means are first centered ahead and behind gap 44, and operating cylinders 50 are actuated to clamp rail section ends 42, 43. Welding head 15 is then placed between pairs 47, 48 of rail clamping jaw means and operating cylinders 75 are actuated to clamp the rail section ends between pairs 73, 74 of the clamping and welding jaws of the welding head. Even before the welding head is placed on the rail or before the clamping and welding jaws are engaged therewith, operating cylinders 50 are actuated further to pull one of the rail section ends towards the other rail section end, whereupon the welding process proper is initiated by welding control 14 with the actuation of cylinders 50, 75, 76. Operating cylinders 50 are actuated at least during the final compression stage of the welding process, in conjunction with hydraulic cylinders 76 connected in parallel thereto. This assures a joint and uniform rail tensioning by the welding head and the rail tensioning apparatus.

What is claimed is:

1. A mobile electric flash-butt welding machine for welding together adjacent ends of successive rail sections of a rail of a track consisting of two rails fastened to successive ties, which comprises
    (a) a machine frame,
    (b) undercarriages supporting the machine frame on the track for mobility therealong in an operating direction,
    (c) a drive for propelling the machine frame along the track, and the machine frame carrying
    (d) a hydraulic fluid supply pump means,
    (e) an electric current generator,
    (f) motor means for operating the pump means and the generator,
    (g) a longitudinally, transversely and vertically adjustable electric flash-butt welding head for selectively welding together the adjacent rail section ends of a respective one of the track rails, the welding head comprising
        (1) two welding head halves movable towards and away from each other in a direction of the rail,
        (2) hydraulic cylinders for moving the two welding head halves in said direction,
        (3) a pair of clamping and welding jaws on each welding head half, and
        (4) a hydraulic clamping cylinder connecting the jaws of each pair,
    (h) a welding control connecting the pump means and generator to the hydraulic cylinders and jaws respectively for hydraulically and electrically operating the clamping and welding jaws, and
    (i) an apparatus for tensioning or longitudinally sliding the rail, the apparatus being associated with the welding head for encompassing the welding head in a horizontal plane passing through the rail and comprising
        (1) two pairs of rail clamping jaw means for engaging the rail section ends immediately ahead of, and behind, the welding head, and
        (2) a hydraulic cylinder-piston arrangement extending in the direction of the rail and comprising respective operating cylinders connecting the pairs of rail clamping jaw means for operation thereof.

2. The mobile electric flash-butt welding machine of claim 1, wherein the welding head further comprises a hydraulically operable welding seam shearing device.

3. The mobile electric flash-butt welding machine of claim 1, wherein the apparatus comprises a ring-shaped mechanical structural unit including the two pairs of rail clamping jaw means longitudinally spaced from each other in the direction of the rail and the hydraulic cylinder-piston arrangement, the arrangement having a respective hydraulic cylinder-piston device arranged on each side of the rail, the pairs of rail clamping jaw means being longitudinally spaced and the cylinder-piston devices being transversely spaced to define a central space within the ring-shaped mechanical structural unit, the central space, measured in the horizontal plane, having a width and a length at a maximum longitudinal spacing of the pairs of rail clamping jaw means in a rail clamping position respectively larger than the width and the length of the cross section of the maximally adjusted welding head halves.

4. The mobile flash-butt welding machine of claim 3, wherein the operating cylinders of the two cylinder-piston arrangements extend in the direction of the rail and have connections for flexible hydraulic fluid hoses connecting the operating cylinders to the hydraulic fluid supply pump means.

5. The mobile electric flash-butt welding machine of claim 3, wherein the hydraulic cylinders of the devices are constructed to exert a tensioning force of more than 120 tons in the horizontal plane and the direction of the rail.

6. The mobile electric flash-butt welding machine of claim 3, wherein each rail clamping jaw means comprises a bell crank lever.

7. The mobile electric flash-butt welding machine of claim 3, wherein the mechanical structural unit is comprised of two sections successively arranged in the direction of the rail and electrically insulated from each other, each section being arranged symmetrically with respect to a longitudinal plane of symmetry of the unit, and connecting means fastening the two sections together at each side of the rail, the connecting means including an electrical insulating layer.

8. The mobile electric flash-butt welding machine of claim 7, further comprising a tensile member extending in the direction of the rail and connecting a respective one of the rail clamping jaw means of one of the pairs to a respective one of the pistons of the device at each side of the rail, a respective one of the electrical insulating layers extending in each tensile member transversely to said direction.

9. The mobile electric flash-butt welding machine of claim 1, wherein the hydraulic cylinder-piston arrangement is connected to the hydraulic fluid supply pump means for common operation with the hydraulic cylinders of the welding head.

10. The mobile electric flash-butt welding machine of claim 9, wherein the hydraulic cylinder-piston arrangement is connected to the welding control for synchronization of the welding and rail tensioning operations.

11. The mobile electric flash-butt welding machine of claim 1, further comprising hydraulic fluid lines connecting the operating cylinders of the rail tensioning apparatus and the hydraulic cylinders for moving the welding head halves in parallel to a hydraulic fluid flow control means, the hydraulic fluid flow control means comprising a 4/3-way valve, a hydraulic flow control valve having an inlet and an outlet, and a pressure control valve connected to a 4/2-way valve, the 4/2-way valve being connected to a further hydraulic fluid line interconnecting the inlet and outlet of the hydraulic flow control valve.

12. The mobile electric flash-butt welding machine of claim 11, wherein the hydraulic flow control valve is arranged to change the flow of the hydraulic fluid passing through the operating cylinders of the rail tensioning apparatus and of the hydraulic cylinders moving the welding head halves, further comprising an electrical line connecting the hydraulic flow control valve to the welding control and transmitting an analog electrical control signal of a respective welding program for changing the operating speed of the cylinders in response to the control signal.

13. The mobile electric flash-butt welding machine of claim 1, further comprising drives mounting the flash-butt welding head on the machine frame for longitudinal, transverse and vertical adjustment with respect thereto, and further drives mounting the rail tensioning apparatus on the machine frame for longitudinal, transverse and vertical adjustment, the rail tensioning apparatus being mounted ahead of the welding head in the operating direction in a longitudinally retracted position of the welding head.

14. The mobile electric flash-butt welding machine of claim 13, wherein the machine frame comprises a main frame part and a trailer frame part, the trailer frame part comprising a cantilevered bridge-like frame pivotally supported on the main frame part, the bridge-like frame being centered between one of the undercarriages supporting the main frame part on the track and another one of the undercarriages supporting the trailer frame part on the track, the welding head and the rail tensioning apparatus being mounted on the bridge-like frame between the one and the other undercarriage, and further comprising longitudinal and transverse guides in the bridge-like frame longitudinally and transversely displaceably carrying the welding head, a suspension vertically displaceably carrying the welding head on the drive for vertically adjusting the welding head, a transverse guide in the bridge-like frame transversely displaceably carrying the rail tensioning apparatus, a telescopingly extensible and retractible support arm laterally pivotal about the transverse guide, and a suspension vertically displaceably carrying the apparatus on the support arm for vertically adjusting the apparatus, the drives including hydraulic operating cylinders.

15. The mobile electric flash-butt welding machine of claim 13, further comprising an operator's cab on the trailer frame part, the rail tensioning apparatus being mounted within view of the cab.

16. The mobile electric flash-butt welding machine of claim 13, wherein the other undercarriage supporting the trailer frame part on the track is a single axle with flanged wheels engaging the track rails, further comprising a vertically adjustable hydraulic support jack arranged to raise the trailer frame part off the track to relieve the track of the weight of the trailer frame part.

17. A method of flash-butt welding adjacent ends of successive rail sections of a rail of a track consisting of two rails fastened to successive ties with a mobile flash-butt welding machine, the machine comprising a machine frame, undercarriages supporting the machine frame on the track for mobility therealong in an operating direction, a drive for propelling the machine frame along the track, and the machine frame carrying a hydraulic fluid supply pump means, an electric current generator, motor means for operating the pump means and the generator, a longitudinally, transversely and vertically adjustable electric flash-butt welding head for selectively welding together the adjacent rail section ends of a respective one of the track rails, the welding head comprising two welding head halves movable towards and away from each other in a direction of the rail, hydraulic cylinders for moving the two welding head valves in said direction, a pair of clamping and welding jaws on each welding head half, and a hydraulic clamping cylinder connecting the jaws of each pair, a welding control connecting the pump means and generator to the hydraulic cylinders and jaws respectively, the control being programmed for hydraulically and electrically operating the clamping and welding jaws, and an apparatus for tensioning or longitudinally sliding a rail, which apparatus is associated with the welding head for encompassing the welding head in a horizontal plane passing through the rail and comprises two pairs of rail clamping jaw means and a hydraulic cylinder-piston arrangement extending in the direction of the rail and comprising respective operating cylinders connecting the pairs of rail clamping jaw means for operation thereof, which method comprises the steps of
(a) clamping the successive rail section ends ahead and behind the adjacent ends with the two pairs of rail clamping jaw means by engaging the rail section ends immediately ahead of, and behind, the adjacent ends,
(b) tensioning or longitudinally sliding at least one of the rail sections by operating the operating cylinders, and
(c) flash-butt welding the two rail section ends together between the two pairs of rail clamping jaw means in an initial welding stage followed by a final compression impact welding stage.

18. The electric flash-butt welding method of claim 17, wherein the rail section is tensioned before welding is initiated.

19. The electric flash-butt welding method of claim 17, wherein the rail section is tensioned during the final compression impact welding stage.

20. The electric flash-butt welding method of claim 17, comprising the further step of shearing the welding seam with a hydraulically operable welding seam shearing device on the welding head.

21. The electric flash-butt welding method of claim 17, wherein the hydraulic cylinders for moving the welding head halves and the operating cylinders of the rail tensioning apparatus are connected in parallel to the hydraulic fluid supply pump means, and the control operates the operating cylinders at the same displacement speed.

22. The electric flash-butt welding method of claim 21, wherein the operating cylinders of the rail tensioning apparatus and the hydraulic cylinders connected in parallel are operated at the same time at least during the final compression impact welding stage.

23. The electric flash-butt welding method of claim 17, wherein the pairs of rail clamping jaw means are first centered with respect to the adjacent rail section ends, the welding head is then placed between the pairs of rail clamping jaw means after the rail section ends are engaged by the rail clamping jaw means by operating the operating cylinders, the hydraulic clamping cylinders are operated to engage the rail section ends between the clamping and welding jaws of the welding head, and the operation of the operating cylinders and hydraulic cylinders for moving the welding head halves as well as the electric flash-butt welding are synchronized by the control.

* * * * *